(No Model.)

F. J. SMITH.
CHECK REIN CLIP.

No. 309,165. Patented Dec. 9, 1884.

WITNESSES:

INVENTOR:
F. J. Smith
BY Munn & Co
ATTORNEYS.

UNITED STATES PATENT OFFICE.

FREDERICK J. SMITH, OF BROOKLYN, NEW YORK, ASSIGNOR OF ONE-THIRD TO THOMAS F. McGOLDRICK, OF SAME PLACE.

CHECK-REIN CLIP.

SPECIFICATION forming part of Letters Patent No. 309,165, dated December 9, 1884.

Application filed April 19, 1884. (No model.)

*To all whom it may concern:*

Be it known that I, FREDERICK J. SMITH, of Brooklyn, in the county of Kings and State of New York, have invented a new and Improved Check-Rein Clip, of which the following is a full, clear, and exact description.

The invention consists, principally, of a check-rein clip for harnesses arranged to permit the horse to be unchecked and also checked up by a line reaching back to the vehicle.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
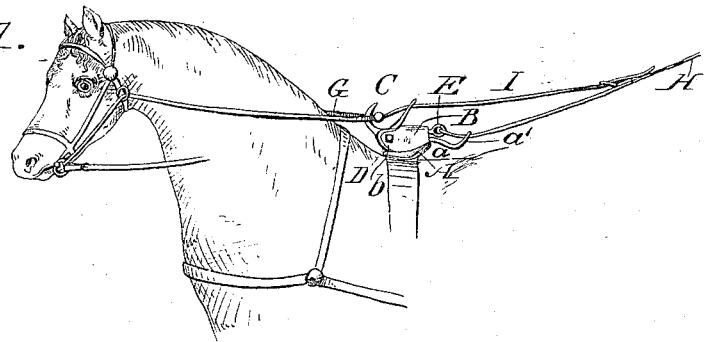
Figure 2:
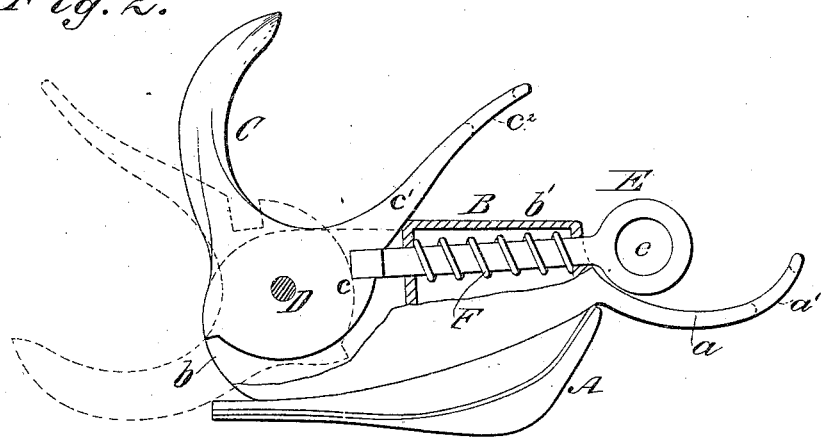
Figure 3:
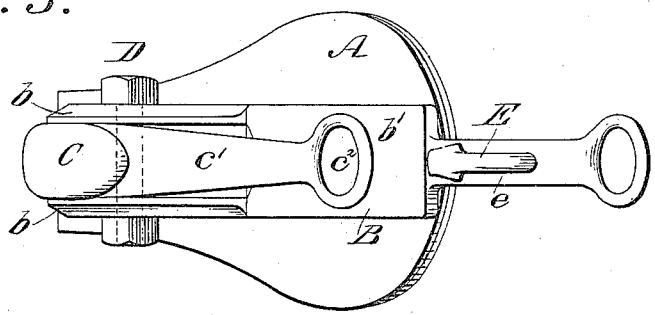

Figure 1 is a perspective view of my new and improved rein-clip as it appears when in place upon the harness holding the check-rein. Fig. 2 is a sectional elevation of the clip, and Fig. 3 is a plan view thereof.

A represents the saddle or main body of the clip. This is formed or provided with the upward extension, B, which is formed with the check-pieces $b\ b$, to and between which the check-hook C is pivoted upon the bolt D.

Through the bridge portion $b'$ of the upward extension, B, passes the bolt E, which is constantly pressed forward by the spring F for engaging with the notch $c$, made in the rear edge of the hook C, for holding the hook in the upright position shown in full lines in the drawings, for holding the check-rein G, as shown in Fig. 1. The rear end of the bolt E is finished, by preference, to form the ring $e$, and to this is attached the line H, which leads back to the vehicle, so that by drawing up this line the bolt E may be drawn backward against the tension of the spring F for disengaging the head of the bolt C from the notch $c$, so as to permit the hook C to tilt forward to the position shown in dotted lines in Fig. 2 for releasing the check-rein G. The line H and check-rein G are connected by the strap I, which passes through the ring $c^2$, formed in the rear extension, $c'$, of the hook C, as shown clearly in Fig. 1, so that by this strap I the check-rein G, line H, and check-hook C are all connected together. The line H, after leaving the eye $e$ of the bolt C, passes through the eye $a'$, formed in the rear extension, $a$, of the upward extension B, as shown clearly in Fig. 1, which eye acts as a guide to the said line H.

In use, the check-rein being held by the check-hook C, and the hook C held in upright position by the bolt E, to uncheck the horse the driver has simply to draw backward upon the line H, which will withdraw the bolt E from the notch $c$, so that by slightly raising and giving slack to the line H the hook C will tip forward to the position shown in dotted line in Fig. 2 and release the check-rein G.

To check the horse up again, it is only necessary to draw upon the line H, which will first act upon the strap I, drawing it backward, so as to bring the check-rein G into the check-hook C; then it will act upon the hook C, causing it to be turned upon its pivot to an upright position, where it will be caught and held by the bolt E, causing it to hold the check-rein in position for checking the horse up. By this means it will be seen that the horse may be both checked and unchecked without the necessity of leaving the vehicle and without stopping the motion of the horse.

Having thus described my invention, I claim as new and desire to secure by Letters Patent—

1. In a check-rein holder, a pivoted check-hook, combined with a bolt for locking the hook in an upright position, and means, substantially as described, for unlocking the same, all substantially as set forth.

2. The pivoted check-hook $b$, combined with the bolt E, line H, attached to the bolt, and the strap I, attached to the check-rein, substantially as and for the purposes set forth.

3. The bolt C, placed in the upward extension, B, and provided with spring F, in combination with the pivoted check-hook C, having notch $c$, for receiving the bolt C, substantially as and for the purposes set forth.

4. The upward extension, B, containing the bolt E and pivoted check-hook C, and formed with the guiding-eye $a'$, combined with the line H, passing through eye $a'$, and attached to eye $e$, and with the strap I, attached to line H and to rein G, passing through eye $c^2$, formed at the rear end of the hook C, substantially as and for the purposes set forth.

5. The check-hook C, pivoted in between the check-pieces $b\ b$, provided with a locking-bolt, and formed with the extension $c'$, having an opening, $c^3$, in its outer end, substantially as and for the purposes set forth.

FREDK. J. SMITH.

Witnesses:
H. A. WEST,
C. SEDGWICK.